(12) United States Patent
Chen

(10) Patent No.: US 12,446,630 B1
(45) Date of Patent: Oct. 21, 2025

(54) SYSTEMS AND METHODS FOR DISCOVERING AND CONTROLLING ELECTRONIC DEVICES

(71) Applicant: IKE Tech LLC, Santa Ana, CA (US)

(72) Inventor: Thomas Chen, Costa Mesa, CA (US)

(73) Assignee: IKE Tech LLC, Santa Ana, CA (US)

( * ) Notice: Subject to any disclaimer, the term of this patent is extended or adjusted under 35 U.S.C. 154(b) by 0 days.

(21) Appl. No.: 19/041,818

(22) Filed: Jan. 30, 2025

(51) Int. Cl.
*A24F 40/50* (2020.01)
*A24F 40/65* (2020.01)
*H04L 9/32* (2006.01)

(52) U.S. Cl.
CPC .............. *A24F 40/50* (2020.01); *A24F 40/65* (2020.01); *H04L 9/3231* (2013.01)

(58) Field of Classification Search
None
See application file for complete search history.

(56) References Cited

U.S. PATENT DOCUMENTS

| | | | |
|---|---|---|---|
| 10,440,999 B2 * | 10/2019 | Tremblay | ................ A24F 40/65 |
| 11,000,076 B2 | 5/2021 | Tremblay | |
| 11,842,347 B2 | 12/2023 | Keen | |
| 11,880,438 B2 | 1/2024 | Sweeney | |
| 11,886,952 B2 | 1/2024 | Sweeney | |
| 2018/0263073 A1 * | 9/2018 | Zhou | ..................... H04W 76/36 |
| 2020/0229248 A1 * | 7/2020 | Fong | ..................... H04W 76/11 |
| 2022/0330029 A1 * | 10/2022 | Wang | ................. H04W 12/108 |
| 2022/0398602 A1 * | 12/2022 | Guo | ......................... G06F 21/36 |
| 2023/0245137 A1 * | 8/2023 | McCullough | .... G06K 19/06037 |
| | | | 705/318 |

* cited by examiner

*Primary Examiner* — Ario Etienne
*Assistant Examiner* — Mohammad Yousuf A. Mian
(74) *Attorney, Agent, or Firm* — Haynes and Boone, LLP

(57) ABSTRACT

Methods and systems are presented for providing a computer framework that enables secure and effective access control of electronic devices. Electronic devices that have been registered with the computer framework are associated with access criteria, specifying requirements of users for accessing the electronic devices. The electronic devices also include a customized communication component that is not discoverable unless through a dedicated application executed on a user device. When a registered electronic device is discovered by the application, the application performs a handshake protocol for authenticating the electronic device. The application establishes a network connection with the electronic device only after the electronic device is authenticated and the attribute of the user is verified. The application then activates the electronic device via the network connect and enables the user to access a functionality of the electronic device.

20 Claims, 8 Drawing Sheets

SYSTEMS AND METHODS FOR DISCOVERING AND CONTROLLING ELECTRONIC DEVICES

TECHNICAL FIELD

The present specification generally relates to computer-based mechanisms for discovering and controlling electronic devices.

BACKGROUND

Electronic devices, such as gaming devices, vaping devices, vending machines, etc., are becoming more prevalent as they provide users with better experiences than the corresponding traditional non-electronic devices by providing additional functionalities and flexibilities. However, some of these electronic devices may not be intended for everyone or may be limited to certain users that satisfy a set of criteria (e.g., age criteria, citizenship criteria, etc.). For example, an electronic vaping device may be restricted to users below a certain age. It has been contemplated that enforcing such restrictions at the point of sale is ineffective to limit the use of these electronic devices by only the users that satisfy the set of criteria, as the purchasers can easily give the devices, or products and/or services associated with the devices, (e.g., by way of a private sale, etc.) to other users who do not satisfy the set of criteria. Existing computer-based user authentication mechanisms also lack the integration needed to validate both the user and the device dynamically. As such, there is a need for a computer-based end-to-end system that can securely and effectively control the access of these devices.

DETAILED DESCRIPTION

Figure 1:
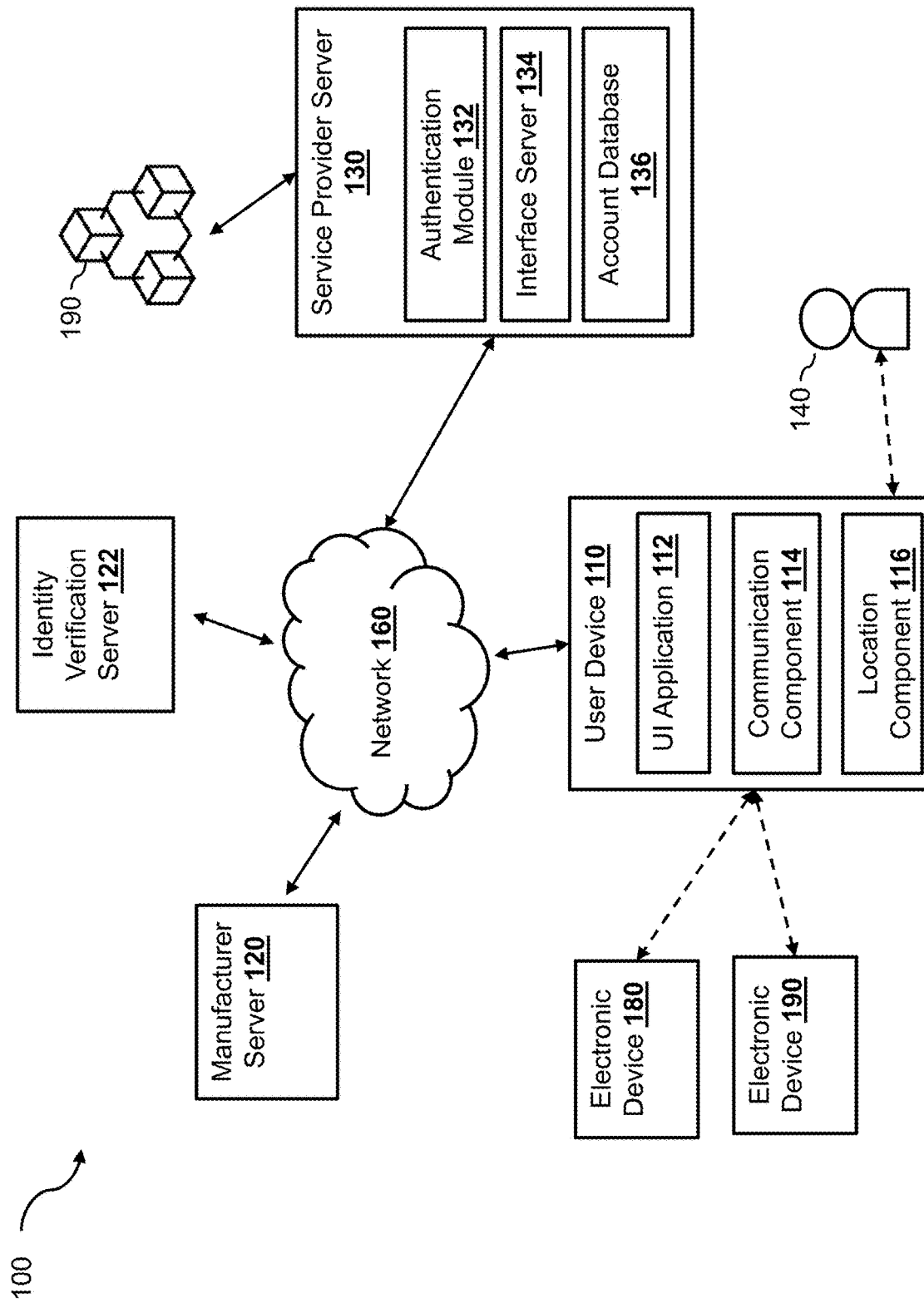
FIG. 1 is a block diagram illustrating a networked system for providing access control of electronic devices according to an embodiment of the present disclosure.

The present disclosure includes methods and systems for providing a computer framework that enables secure and effective access control of electronic devices. As discussed herein, some electronic devices are limited to certain users having particular attributes, such as a particular age requirement, a particular citizenship requirement, a particular identity (e.g., using a whitelist of users who are granted access to the electronic devices or a blacklist of users who are denied access to the electronic devices, etc.). These electronic devices may be limited in functionalities (e.g., limited processing power, limited connectivity such as lack of the capability to connect to the Internet, etc.), as they are not general-purpose computer devices. For example, some of these electronic devices may be single-purpose (or limited-purpose) devices, such as an electronic vaping device, an electronic vending machine, an electronic lock, etc. Due to their limited capacity, it is a challenge to implement computer functionalities for verifying an attribute of the user on the electronic devices themselves.

As such, according to various embodiments of the disclosure, the computer framework provides an application (e.g., a mobile application, a web application, etc.) that can be executed on a user device (e.g., a smart phone, a tablet, etc.) for communicating with and controlling one or more electronic devices. The application may perform access control functionalities for the electronic devices via communications between the application and a communication component (also referred to as a "communication element") of the electronic device. Since the user device may have more capabilities (e.g., more processing power, more connectivity such as capable of connecting to the Internet, etc.) than the electronic devices, the application may use the computer resources of the user device to perform a user verification process that verifies the attribute of the user of the user device, and then connect with and control the electronic devices, such that the application may grant the user access to one or more functionalities of the electronic device only when the attribute of the user is verified.

In some embodiments, the application may provide a user interface on the user device. Through the user interface, the application may receive a request to connect to certain electronic devices from a user of the user device. The application may then initiate a verification flow for verifying the attribute of the user. For example, the application may first determine whether the user has an account with an identity verification system (e.g., CLEAR®, Incode®, etc.). If it is determined that the user does not have an account with the identity verification system, the application may initiate a workflow for registering an account for the user. According to the workflow, the application may activate a sensor (e.g., a camera, a fingerprint sensor, etc.) of the user device and capture biometric data (e.g., an image of a face of the user, a scan of a fingerprint of the user, etc.) of the user. The application may also capture an image of an identity document (e.g., a government issued document such as a driver's license, a passport, etc.). The application may transmit an application programming interface (API) call to the identify verification system for registering an account of the user. The API call may include the biometric data and the image of the identity document. When the account is successfully registered with the identity verification system, the application may receive a 'success' notification from the identity verification system as a response to the API call. In some embodiments, the response may also include user data associated with the user, which may represent one or more attribute values associated with the user (e.g., a birthday, a citizenship, a residential address, a legal name, etc.).

On the other hand, if it is determined that the user already has an account with the identity verification system, the application may activate a sensor (e.g., a camera, a fingerprint sensor, etc.) of the user device and capture biometric data (e.g., an image of a face of the user, a scan of a fingerprint of the user, etc.) of the user, and then transmit the biometric data to the identity verification system via another API call (e.g., an API call for verifying an identity of the user). Based on the biometric data, the identity verification system may determine an identity of the user by matching the user with a corresponding identity document, and may provide user data from the identity document to the application as a response to the API call. The user data may represent one or more attribute values associated with the user (e.g., a birthday, a citizenship, a residential address, a legal name, etc.). Based on the user data, the application may verify whether the user has the attribute required for accessing the electronic device (or which types of electronic devices the user is allowed to access, etc.).

In some embodiments, the application may also verify other information associated with the user and/or the user device. For example, if some of the electronic devices have location restrictions (e.g., restricting the use of electronic vaping devices or electronic gaming devices around school areas, etc.), the application may also use location data obtained from a location component (e.g., a GPS component) of the user device to verify that the location information of the user is not in a restricted location associated with the electronic device.

It has been contemplated that different electronic devices may have different criteria for the users to access the devices. For example, some electronic devices may have an age criterion (e.g., only users above a certain age can access the devices, etc.). Some electronic devices may have a citizenship criterion. Some other electronic devices may have a residential address criterion. As such, the application (or a server communicatively connected to the application) may store access criteria information for different types of electronic devices in a database. Based on the user data obtained from the identity verification system (and other data obtained from different components, such as the location component, of the user device) and the criteria information stored in the database, the application may determine which types of electronic devices are accessible by the user.

In some embodiments, the computer framework may enable entities associated with different electronic devices (e.g., manufacturers or seller of the electronic devices, etc.) to register electronic devices with the computer framework. For example, the server may provide a user interface that enables the entities to register different electronic devices with the computer framework, such that access to these registered electronic devices may be securely and effectively controlled using the techniques disclosed herein. The server may receive, from the entities via the user interface, device information (e.g., a device identifier unique to the device, such as a MAC address, etc.) associated with each of the electronic devices to be registered with the computer framework. The interface may also enable the entities to specify a set of criteria for restricting access to each of the electronic devices. The set of criteria may include an age criterion, a residential address criterion, an identity criterion, certification criterion, etc.). The server may then store the device information and the set of criteria in a database together (e.g., as records) such that each device corresponds to a set of criteria.

In some embodiments, the server may also issue a token for each of the registered electronic devices. The token can be used by the application to authenticate the devices (e.g., to ensure that the device is a registered device with the computer framework, to ensure that the device is not a counterfeit device, to ensure that the device has not been tampered with, etc.). In some embodiments, the token is a blockchain token that is issued (e.g., minted) in association with a particular blockchain associated with the computer framework. The server may then store a record on the blockchain to associate the token with the corresponding electronic device (e.g., the device identifier) and other information.

In some embodiments, a customized communication component is implemented within each of the electronic devices that has been registered with the computer framework. The communication component can be configured to communicate with other devices (e.g., user devices or other electronic devices) using any communication technologies, such as Bluetooth Low Energy (BLE) communications, near-field communications (NFC), Wi-Fi communications, etc. The communication component that is implemented in an electronic device is customized, such that it is not discoverable by any devices (e.g., any BLE-enabled computer devices, any NFC-enabled computer devices, etc.) except when used by the application provided by the computer framework. For example, the communication component that is implemented in each of the electronic devices may be assigned a particular service identifier (e.g., a service UUID, etc.) that is outside a specific range of service identifiers that are recognized by computer devices, such that the electronic devices are not discoverable by any devices. In some embodiments, different types of electronic devices may be assigned with different service identifiers. For example, a first service identifier may be assigned to electronic vaping devices, a second service identifier may be assigned to electronic locks, a third service identifier may be assigned to electronic vending machines, and so forth, such that the application can recognize a type of electronic device based on the service identifiers included in the signals emitted by the electronic devices. In some embodiments, different service identifiers may be assigned to different electronic devices having different access criteria. The application and/or the server communicatively may also store the service identifiers that are assigned to the different types of electronic devices, and associate the service identifiers with the corresponding electronic devices and their access criteria in the database, such that the application may recognize these devices based on the specifically assigned service identifiers.

In some embodiments, the computer framework may also require that the communication component of each registered electronic device to store the token assigned to the electronic device. In addition, the computer framework may also require that the communication component of the electronic device to be connected to a control component of the electronic device that controls a functionality of the electronic device. For example, when the electronic device is an electronic vaping device, the communication component may be connected to a heating element of the electronic vaping device such that the communication component may control (e.g., activate, turn on, unlock, or deactivate, turn off, lock, etc.) the heating element for heating (e.g., vaporizing) a substance stored in a cartridge of the electronic vaping device. When the electronic device is an electronic lock, the communication component may be connected to a locking mechanism for controlling (e.g., locking, unlocking, etc.) the electronic lock. When the electronic device is an electronic vending machine, the communication component may be connected to a user interface of the electronic vending machine for controlling (e.g., enabling a user to use the vending machine, denying a user from using the vending machine, etc.). When the electronic device is sold, the control component may be set initially to a deactivated/locked/off state. The control component is activated/unlocked/turned on only in response to an action performed by the communication component (e.g., flipping a switch, transmitting a signal, etc.).

In some embodiments, the communication component of each of the electronic devices is configured to emit communication signals (e.g., BLE signals, NFC signals, etc.) that includes the corresponding service identifier. As such, once the attribute of the user is verified by the application executed on the user device, the application may use a communication component (e.g., a wireless communication chip such as a Bluetooth Low Energy (BLE) chip, an NFC chip, a Wi-Fi chip, etc.) of the user device to scan for registered electronic devices that are within a distance threshold of the user device. In some embodiments, when the application uses the communication component of the user device to scan for electronic devices, the application may specifically scan for electronic devices that emit signals comprising service identifiers that have been assigned to the electronic devices by the computer framework. Since different types of devices may be within a threshold distance from the user device, the application may detect signals (e.g., wireless signals such as BLE signals, NFC signals, etc.) emitted from different devices. The application may obtain service identifiers that are included from each of the signals, and may determine whether the devices that emit the signals are registered devices based on the service identifiers (e.g., whether the service identifiers correspond to the ones assigned to electronic devices by the computer framework). When the application determines that the service identifiers emitted from one or more devices correspond to the identifiers assigned by the computer framework, the application may determine a set of criteria associated with the electronic device (the set of criteria that limits users for using the device) based on a record from the database. The application may then determine whether the user is permitted to access any one of the one or more devices based on the user data and/or data obtained from the user device. For example, based on the attributes associated with the user and/or the user device, the application may determine that the user is permitted to access a first type of electronic devices, but not a second type of electronic devices.

If it is determined that the user is not permitted to access the electronic device from which the signals are emitted, the application may provide a notification on a user interface of the application indicating that no available devices are found. On the other hand, if it is determined that the user is permitted to access the electronic device from which the signals are emitted, the application may initiate a handshake protocol with the electronic device. The handshake protocol enables the application to authenticate the electronic device (e.g., that the electronic device is indeed one that is associated with the computer framework, the electronic device is not a counterfeit, etc.), and for the electronic device to authenticate the application. The application may instruct the user device to connect (e.g., pair) with the electronic device only if the electronic device successfully completes the handshake protocol with the application.

In some embodiments, the handshake protocol involves the application requesting a data package from the electronic device. The data package may include a token issued by the server to the electronic device and a device identifier (e.g., a MAC address, etc.) that is unique to the electronic device. The data package may be encrypted using any one of the encryption techniques (e.g., RSA encryption techniques, etc.). The application may communicate the token and the device identifier to the server, for example, in the form of an authentication request. The server may, in turn, access a record on a ledger (e.g., a blockchain) associated with the computer framework using the token. The record may include a device identifier that was used to register the electronic device in association with the token. The server may determine that the electronic device is authenticated when the device identifier received from the application corresponds to (e.g., matches) the device identifier in the record. The server may transmit a response to the authentication request indicating whether the electronic device is authenticated.

In some embodiments, the server may use a custom gateway for processing the authentication request. For example, the custom gateway may validate an encrypted token provided by the electronic device. The custom gateway may also further validate the electronic device based on a device identifier (e.g., a MAC address) provided by the device (e.g., determining whether the device identifier corresponds to a record in the blockchain). This way, the custom gateway may determine if the electronic device is an authentic (e.g., not a counterfeit) device registered with the computer framework. In some embodiments, the gateway may also monitor (e.g., track) authentication requests associated with the electronic device based on the device identifier and token received from one or more user devices. If the gateway detects a suspicious behavior associated with the authentication of the electronic device (e.g., authentication requests for the same electronic device received from different user devices from different locations within a threshold period of time, etc.), the gateway may also deny connection between the application and the electronic device.

If the electronic device is not authenticated, the application may provide a notification on a user interface of the application indicating that no available devices are found, and deny a connection between the application and the electronic device. On the other hand, if it is determined that the electronic device is authenticated, the application may complete the handshake protocol with the electronic device, and establish a network connection with the electronic device (e.g., pairing the user device with the electronic device, establishing a wireless communication connection, such as a BLE connection, with the electronic device). For example, the gateway may provide a specific key (e.g., an encryption key) to the application (which is recognized by the electronic device), which can be used for establishing a connection between the application and the electronic device. The gateway may also operate on a proprietary communication protocol that ensures exclusive interoperability between authorized electronic devices and applications. It may also provide custom signalizing standards and frame structures that minimize vulnerabilities to eavesdropping and spoofing.

The application may maintain the network connection with the electronic device (e.g., maintaining a communication session, etc.) until a termination condition exists (e.g., the user indicated a termination of the connection, the electronic device has been moved outside of the threshold distance from the user device, etc.). In some embodiments, the computer framework may also require that the electronic device to authenticate the application before the network connection is established. For example, the application may transmit a signed package that is encrypted using a private key associated with the application. In some embodiments, the signed package may also be signed using a private key associated with the server, such that the electronic device may ensure that the application is authenticated by the server during the handshake protocol. The communication component of the electronic device, which stores a corresponding public key associated with the application when the electronic device was registered, may attempt to decrypt the package using the public key associated with the application. The communication component may authenticate the application if the attempt to decrypt the package is successful.

In some embodiments, a satellite-based network may be used to enable the handshake protocol to be completed even when the user device (where the application resides) has limited or no Internet access. In some embodiments, the gateway of the server may be communicatively connected with the satellite-based network. In these embodiments, the communication components of the electronic devices and/or the user devices may be satellite-enabled components (e.g., satellite-enabled BLE chips, etc.). The satellite-based network may act as an intermediary between the electronic devices/user devices and the server/gateway. For example, the application may send the authentication request (which includes the token and encrypted identifiers of the electronic device) to the server/gateway via the satellite network, and receives a response (e.g., authorized/denied, etc.) from the server/gateway via the satellite network. This way, the application may still be able to connect with electronic devices in close proximity even when the application has limited or no Internet connectivity.

In some embodiments, before establishing the network connection with the electronic device, the application may present a representation of the electronic device (e.g., an icon) on a user interface of the application. The representation may indicate a type of electronic device (e.g., whether the device is an electronic vaping device, an electronic lock, an electronic vending machine, etc.), and an identity of the electronic device (e.g., the device identifier, etc.). It has been contemplated that the application may detect multiple electronic devices (each with the same or different set of access criteria, etc.) within a threshold distance from the user device, based on communication signals emitted by the multiple electronic devices. When it is determined that multiple electronic devices are registered with the computer framework and that the user is permitted to access the multiple devices, the application may present representations of the multiple devices on the user interface. The presentation of the representation(s) of the electronic device(s) may be selectable to enable the user of the user device to select an electronic device to connect with the user device. Once the application receives a selection, the application may establish a network connection with the selected electronic device.

It is noted that due to the unique characteristics of the communication component of the electronic device, the user would not be able to cause the user device to connect to the electronic device since the electronic device is undiscoverable by the user device. For example, if the user attempts to view any connectable electronic device using any other application of the user device (e.g., a Bluetooth device discovery tool that is part of the user device's operating system), the electronic device would not appear on the native application. Only through the use of the application provided by the computer framework as disclosed herein would the user be able to view the electronic device for connecting with the user device.

In some embodiments, once the network connection has been established, the application may activate a functionality of the electronic device via the communication component (e.g., the BLE chip of the electronic device). For example, the functionality of the electronic device may be deactivated (e.g., an element within the electronic device is off, locked, or in a sleep state, etc.) by default until it is activated (e.g., changing the state of the element within the electronic device from an off/locked/sleep state to an on state or unlocked, etc.) by the communication component. As such, after the network connection is established, the application may instruct the communication component of the electronic device to activate the functionality of the electronic device. This way, the user is not able to access the functionality of the electronic device until the attribute of the user is verified and the electronic device is authenticated by the application under the computer framework.

In some embodiments, the application may enable the user to control the electronic device via the user interface of the application. For example, when the user may turn on/off the electronic device using the application. When the electronic device is an electronic vending machine, the user may purchase any of the items stored in the electronic vending machine via the application. In some embodiments, once the application establishes a network connection with a first electronic device of a particular type (e.g., an electronic vaping device, etc.), the application may deny subsequent access/connection to a second electronic device of the same type until the network connect with the first electronic device is terminated.

In some embodiments, the application and the communication component of the electronic device may keep the control element of the electronic device activated while the network connection is maintained. The communication component may be instructed to deactivate the control element of the electronic device when the network connection is terminated. In some embodiments, after the initial verification process is successfully completed, the application may enable the user to access the functionality of the electronic device for a period of time (e.g., a day, several hours, etc.). At the expiration of the time, the application may perform the user verification process again (e.g., scanning biometric data of the user) and verifying the attribute of the user based on user data obtained from the identity verification system. Only when the attribute of the user is verified would the application maintain the network connection with the electronic device and enable the user to access the functionality of the electronic device. If the attribute of the user is not verified at the expiration of the time, the application may either terminate the network connection with the electronic device (which causes the communication component of the electronic device to deactivate the functionality of the electronic device), instruct the communication component of the electronic device to deactivate the functionality, or both.

In some embodiments, the application may dynamically determine the frequency/interval for re-verifying the attribute of the user. For example, the application may monitor the user's usage pattern of using the functionality of the electronic device, and may determine the frequency for re-verifying the attribute of the user based on the user's usage pattern (e.g., re-verify the attribute of the user only when it is anticipated that the user will use the functionality within a period of time, etc.). By dynamically re-verifying the attribute of the user, the computer framework ensures that the use restriction of the electronic device is effectively enforced without overly burdening the user.

FIG. 1 illustrates a networked system 100, within which the computer framework may be implemented according to one embodiment of the disclosure. Note that the present techniques may be applied in many different computing and technological environments, however, and are not limited to those shown in the figures. The networked system 100 includes a service provider server 130, a user device 110, a manufacturer server 120, an identity verification server 122, and electronic devices 180 and 190. The service provider server 130, the user device 110, the manufacturer server 120, and the identity verification server 122 may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. The user device 110 may be connected to the electronic devices 180 and/or 190 via a private network, such as a peer-to-peer wireless network (e.g., a Bluetooth Low Energy (BLE) network, etc.).

The user device 110, in one embodiment, includes a user interface (UI) application 112 (e.g., a web browser, a mobile application, etc.), which may be utilized by the user 140 to interact with the electronic devices 180 and 190. In one implementation, the user interface application 112 includes a software program (e.g., a mobile application) associated with the service provider server 130 that provides a graphical user interface (GUI) for the user 140 to interface and communicate with the electronic devices 180 and 190. In another implementation, the user interface application 112 includes a browser module that can execute (e.g., render) a web application associated with the service provider server 130.

The user device 110, in various embodiments, includes a location component 116 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used.

The user device 110, in one embodiment, includes at least one communication component 114, which may be implemented, for example, as a network chip (e.g., a network-enabled integrated circuit, a BLE chip, etc.) capable of communicating with other external devices, such as electronic devices 180 and 190 having a similar communication component via a peer-to-peer connection. In some embodiments, the UI application 112 may use the communication component 114 to discover (e.g., scan for) electronic devices (e.g., the electronic devise 180 and 190, etc.) that are within a threshold distance from the user device 110, to establish a network connection with the electronic devices, and to control one or more functionalities of the electronic devices by transmitting commands via the network connection.

In various implementations, the user 140 is able to input data and information into an input component (e.g., a keyboard) of the user device 110. For example, the user 140 may use the input component to interact with the UI application 112 (e.g., to submit a request to connect with one or more electronic devices, to scan biometric data associated with the user 140, to obtain alerts, to submit commands for controlling one or more electronic devices, etc.).

The manufacturer server 120, in various embodiments, may be maintained by a business entity that produces and/or sells one or more electronic devices. Examples of business entities include an electronic vaping device manufacturer, an electronic lock manufacturer, an electronic vending machine manufacturer, etc., which produces various electronic devices that can be sold to consumers directly or via retailers. The manufacturer may use the manufacturer server 120 to interact with the service provider server 130. For example, the manufacturer may use the manufacturer server 120 to register electronic devices (e.g., individual electronic devices or a batch of electronic devices, etc.) with the service provider server 130. During the registration process, the manufacturer may also specify a set of criteria (e.g., a set of access criteria) for accessing one or more functionalities. The set of criteria may be associated with user attributes, such as an age criterion (e.g., above a certain age), a citizenship criterion, a residential address criterion, a certification criterion (e.g., required a certain certification, etc.), location attributes, or any other criteria. The manufacturer may specify the same set of criteria for all of the electronic devices being registered with the service provider server, or specify different sets of criteria for different electronic devices or different groups of electronic devices. By registering the electronic devices with the service provider server 130, the service provider server may assign a service identifier (e.g., a service UUID) to each of the electronic devices. In some embodiments, the same service identifier may be assigned to the electronic devices of the same type. The manufacturer may then incorporate the service identifier into a communication component (e.g., a network chip such as a BLE chip, etc.) of a corresponding electronic device.

In some embodiments, the merchant may also use the merchant server to provide content (e.g., interactive content, augmented reality content, etc.) to the service provider server 130, such that the content may be presented to a user of the electronic device via a user device (e.g., the user device 110) when the user device connects with the electronic device.

While only one manufacturer server 120 is shown in FIG. 1, it has been contemplated that multiple manufacturer servers, each associated with a different manufacturer, may be connected to the user device 110 and the service provider server 130 via the network 160.

The identity verification server 122, in various embodiments, may be maintained by an identity verification entity, which can be the same entity that provides the computer framework or an independent third-party entity, such as CLEAR® or Incode®. The identity verification system may maintain an application programming interface (API) such that other devices, such as the UI application 112 of the user device 110 may communicate with the identity verification server 122 via one or more API calls. For example, the UI application 112 of the user device may transmit an API call for registering a user for a new user account based on biometric data that has been obtained from the user and an image of an identity document associated with the user. The UI application 112 may also transmit another API call for verifying an identity of the user based on biometric data obtained from the user.

The service provider server 130, in one embodiment, may be maintained by an online service provider, which may provide user verification and product authentication services for users (e.g., the user 140 of the user device 110). The service provider server 130 may include an interface server 134 that is configured to serve content (e.g., web content, product content, augmented reality content, etc.) to users and interact with users. For example, the interface server 134 may include a web server configured to serve web content in response to HTTP requests. In another example, the interface server 134 may include an application server configured to interact with a corresponding application (e.g., the UI application 112) installed on the user device 110 via one or more protocols (e.g., RESTAPI, SOAP, etc.). As such, the interface server 134 may include pre-generated electronic content ready to be served to users. For example, the interface server 134 may provide a user interface that enables the manufacturer of the manufacturer server 120 to register electronic devices and to provide content associated with the electronic devise to the service provider server 130. Furthermore, the interface server 134 may also communicate with the UI application 112 and provide, via the UI application 112, a user interface that enables the user to connect with, activate, and control various electronic devices (e.g., the electronic devices 180 and 190, etc.).

The service provider server 130, in one embodiment, may be configured to maintain one or more user accounts and merchant accounts in an account database 136, each of which may be associated with a profile and may include account information associated with one or more individual users (e.g., the user 140 associated with user device 110) and manufacturers. For example, account information may include private information of users and manufacturers, such as one or more account numbers, biometric data, electronic devices associated with the user/manufacturer, passwords, digital wallets information, transaction history, Internet Protocol (IP) addresses, device information associated with the user account.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login or a request, and the user attributes may be utilized by the service provider server 130 to associate the user with one or more particular user accounts maintained by the service provider server 130 and used to determine the authenticity of a request from a user device.

In various embodiments, the service provider server 130 also includes an authentication module 132 configured to verify attributes of users and authenticate electronic devices for the users by communicating with the identity verification server 122 and the blockchain 190. For example, the authentication module 132 may facilitate the authentication of an electronic device using a token that has been issued to the electronic device and stored on the blockchain 190. The authentication module 132 may also facilitate the registration and verification of user attributes by communicating with the identity verification server 122.

Figure 2:
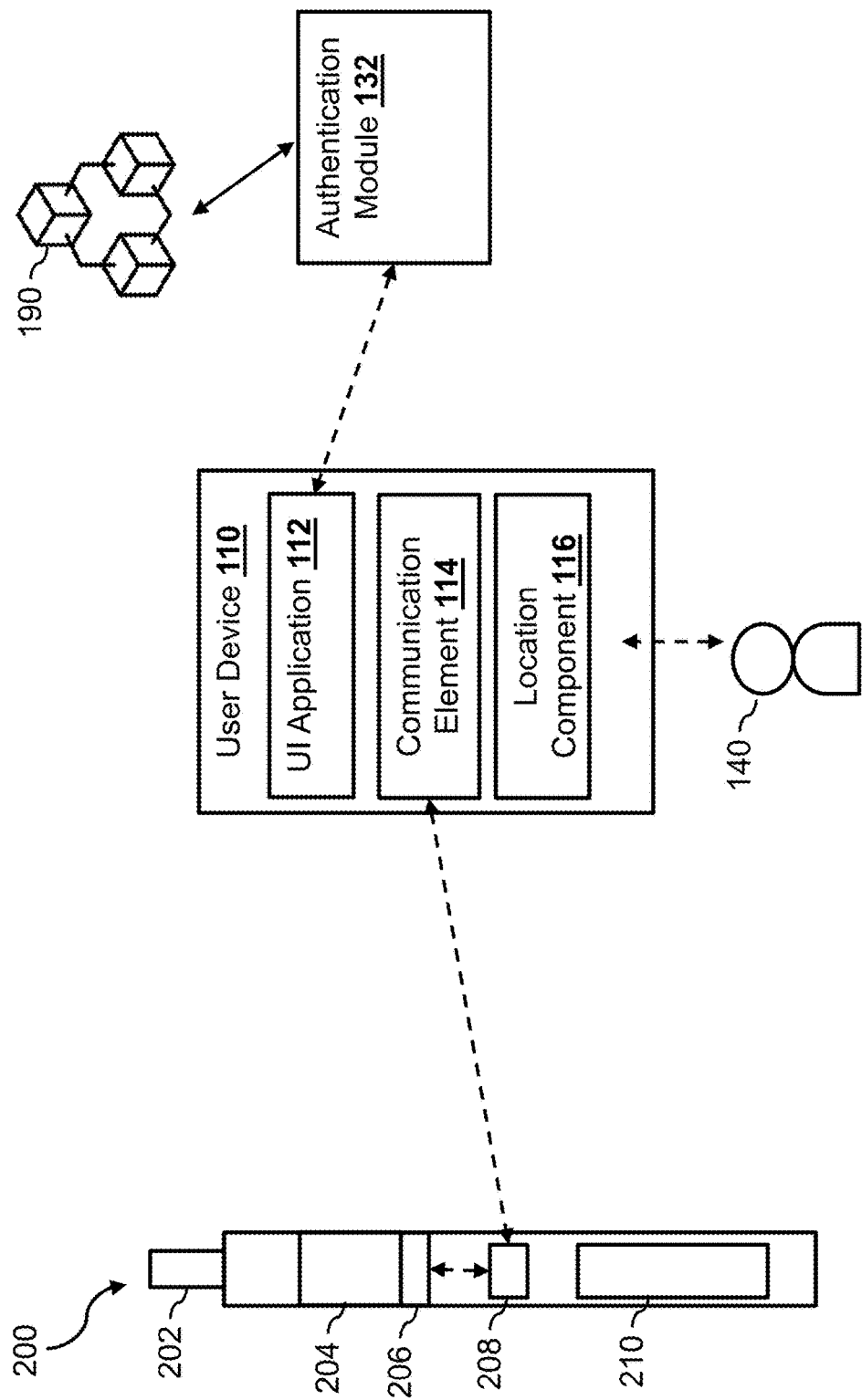
FIG. 2 illustrates an example electronic device that is discoverable by a dedicated application of a user device according to an embodiment of the present disclosure.

FIG. 2 illustrates an example electronic device 200 interacting with other devices of the computer framework according to various embodiments of the disclosure. In this example, the electronic device 200 is an electronic vaping device (even though the electronic device can be of a different type, such as an electronic vending machine, an electronic lock, etc.). The electronic vaping device 200 includes a mouth piece 202 configured to enable a user of the electronic vaping device 200 to inhale vapor generated by the electronic vaping device 200. The electronic vaping device also includes a cartridge 204 for storing a substance (e.g., a liquid, a 'juice,' etc.). The electronic vaping device also includes a heating element 206 configured to heat and vaporize the substance stored in the cartridge 204, and to transform the substance into smoke to be inhaled by a user through the mouth piece 202. The electronic vaping device 200 also includes a power source 210, which can be implemented as a battery, for providing power to the heating element 206.

The heating element 206 may be configured to heat the substance in the cartridge 204 in response to a trigger, such as a detection (e.g., via a sensor (not shown)) of the user inhaling through the mouth piece 202. In some embodiments, the heating element 206 may include a switch (e.g., a hardware switch that connect/disconnect the heating element 206 from the power source 210, a virtual switch, etc.) for activating and deactivating the heating element. When the switch of the heating element 206 is in the deactivated (e.g., locked) position, the heating element 206 is inoperable. That is, the heating element 206 cannot heat the substance stored in the cartridge 204 even when the trigger is detected (e.g., the power source is disconnected, etc.), such that the user 140 may not use or operate the electronic vaping device 200 as intended.

The electronic vaping device 200 also includes a communication component 208 configured to facilitate communications (e.g., peer-to-peer communications) with various devices such as the user device 110. In some embodiments, the communication component 208 may be implemented as a short-range wireless communication chip, such as a BLE chip. The communication component 208 is connected to the heating element 206 such that the communication component 208 can turn on and off the switch of the heating element 206, for example, in response to an instruction transmitted to the electronic vaping device 200 from a user device (e.g., the user device 110, etc.) or detecting a termination of a network connection with the user device, etc.

As discussed herein, when the manufacturer of the electronic vaping device 200 is registered with the service provider server 130, the authentication module 132 may assign a service identifier (e.g., a service UUID, etc.) to the electronic vaping device 200. The service identifier may be assigned to the electronic vaping device 200 based on the type of electronic devices or a particular group of electronic devices to which the electronic vaping device 200 belongs. In some embodiments, the authentication module 132 may assign different service identifiers to electronic devices of the different types (or different groups). The service identifiers that are assigned to various electronic devices (e.g., the electronic vaping device 200) registered with the service provider server 130 are outside a specific range of service identifiers that are recognized by computer devices, such that the electronic devices are not discoverable by any devices. However, the UI application 112 may be configured to recognize the service identifiers that have been assigned by the authentication module 132. For example, the authentication module 132 may communicate the service identifiers that have been assigned to various registered electronic devices to the UI application 112 to be stored in a memory location of the user device 110 associated with the UI application 112. The service provider server 130 may also assign different service identifiers to different types of electronic devices or different groups of electronic devices such that the UI application 112 may recognize a particular type (or a particular group) of electronic devices based on the service identifier included in the signals.

The authentication module 132 may also generate (e.g., mint) a token (e.g., a blockchain token) for the electronic vaping device 200, such that each electronic device may be associated with a distinct corresponding token. The authentication module 132 may store the token, the service identifier, and a device identifier (e.g., a MAC address, etc.) of the electronic vaping device 200 in a record (e.g., a record in the blockchain 190). In some embodiments, the manufacturer may also provide a set of access criteria (e.g., an age criterion, a citizenship criterion, a residential address criterion, a location criterion, etc.) for accessing the electronic vaping device 200 and content (e.g., images, videos, augmented reality content, etc.) associated with the electronic vaping device 200 to the service provider module 132. As such, the authentication module 132 may also store the set of access criteria and the content to be associated with the electronic vaping device 200 on the blockchain 190 or in a separate database that is linked to the token assigned to the electronic vaping device 200.

After registering the electronic vaping device 200 with the service provider server 130, the manufacturer of the electronic vaping device 200 may incorporate the service identifier into the communication component 208, such that the communication component 208 may include the service identifier in the signals that the communication component 208 emits (e.g., broadcasts, etc.). The manufacturer may also store the token assigned to the electronic vaping device 200 in the communication component 208 to be used in a handshake protocol with other devices, such as the UI application 112 of the user device 110.

The UI Application 112 of the user device 110 may receive a request to connect to various electronic devices from the user 140, for example, via a user interface provided by the UI application 112. Upon receiving the request, the UI application 112 may verify an attribute of the user 140. For example, the UI application 112 may first determine whether the user 140 has an account with the identity verification server 122 associated with an identity verification system (e.g., CLEAR®, Incode®, etc.). If it is determined that the user 140 does not have an account with the identity verification server 122, the UI application 112 may initiate a workflow for registering an account for the user 140. According to the workflow, the UI application 112 may activate a sensor (e.g., a camera, a fingerprint sensor, etc.) of the user device 110 and capture biometric data (e.g., an image of a face of the user, a scan of a fingerprint of the user, etc.) of the user 140. The UI application 112 may also capture an image of an identity document (e.g., a government issued document such as a driver's license, a passport, etc.) provided by the user 140. The UI application 112 may transmit an application programming interface (API) call to the identify verification server 122 for registering an account of the user 140. The API call may include the biometric data and the image of the identity document. When the account is successfully registered with the identity verification server 122, the UI application 112 may receive a 'success' notification from the identity verification server 122 as a response to the API call. In some embodiments, the response may also include user data associated with the user 140, which may represent one or more attribute values associated with the user (e.g., a birthday, a citizenship, a residential address, a legal name, etc.).

On the other hand, if it is determined that the user 140 already has an account with the identity verification server 122, the UI application 112 may activate a sensor (e.g., a camera, a fingerprint sensor, etc.) of the user device 110 and capture biometric data (e.g., an image of a face of the user, a scan of a fingerprint of the user, etc.) of the user 140, and then transmit the biometric data to the identity verification server 122 via another API call (e.g., an API call for verifying an identity of the user). Based on the biometric data, the identity verification server 122 may determine an identity of the user 140 by matching the user 140 with a corresponding identity document, and may provide user data from the identity document to the UI application 112 as a response to the API call. The user data may represent one or more attribute values associated with the user (e.g., a birthday, a citizenship, a residential address, a legal name, etc.). Based on the user data, the UI application 112 may verify whether the user has the attribute required for accessing various electronic devices (or which types of electronic devices the user is allowed to access, etc.).

In some embodiments, the UI application 112 may also verify other information associated with the user 140 and/or the user device 110. For example, if some of the electronic devices have location restrictions (e.g., restricting the use of electronic vaping devices or electronic gaming devices around school areas, etc.), the UI application 112 may also use location data obtained from a location component 116 of the user device 110 to verify that the location information of the user is not in a restricted location associated with some of the electronic devices.

The UI application 112 may also scan for devices within a threshold distance from the user device (e.g., detecting signals emitted from communication components of electronic devices such as the communication component 208). As discussed, due to the service identifier included in the signals emitted from the communication component 208, the electronic vaping device 200 is not discoverable by any user devices without the UI application 112. For example, when devices without the UI application 112 scans signals from other electronic devices, the devices may ignore the signals when the service identifier included in the signals are outside of a specific range. However, the UI application 112 may instruct communication element 114 to detect signals with service identifiers that have been specifically assigned to registered electronic devices by the service provider server 130. As such, when the UI application 112, through the communication element 114, detects a signal emitted from the electronic vaping device 200, the UI application 112 may determine if the service identifier included in the signal corresponds to any one of the service identifiers assigned by the service provider server 130 (e.g., included in a list of service identifiers stored in the memory of the user device, etc.). If the UI application 112 determines that the service identifier included in the signal is one of the service identifiers assigned by the service provider server 130, the UI application 112 may begin a handshake protocol with the electronic device (e.g., the electronic vaping device 200) that emitted the signal. The handshake protocol will be described in more detail below by reference to FIGS. 3A and 3B. Through the handshake protocol, the UI application 112 may authenticate the electronic vaping device 200 (e.g., determining that the electronic vaping device 200 has been registered with the service provider server 130, is not a counterfeit or been tampered with, etc.).

If the handshake protocol is completed, indicating that the electronic vaping device 200 is authenticated, the UI application 112 may provide an indication on a user interface of the UI application 112 (e.g., an icon representing the electronic vaping device 200). In some embodiments, the user interface of the UI application 112 may enable the user 140 to select the electronic vaping device 200 to be connected with the user device 110. For example, when multiple registered electronic devices are discovered by the UI application 112, the UI application 112 may present the different discovered electronic devices on the user interface to enable the user 140 to select any one of the electronic devices to be connected with the user device 110.

The UI application 112 may also use the communication element 114 to establish a network connection (e.g., a Bluetooth connection) with the communication component 208 of the electronic vaping device 200. The UI application 114 may also instruct the communication component 208 to activate (e.g., unlock) a functionality of the electronic vaping device 200, such as the heating element 206 of the electronic vaping device 200, such that the user 140 may use and operate the electronic vaping device 200. In some embodiments, the UI application 112 may also retrieve content that is associated with the electronic vaping device 200 from the authentication module 132, and present the content on the user interface of the UI application 112. The UI application 112 may also present a set of control elements on the user interface that enable the user 140 to control one or more functionalities of the electronic vaping device 200 via the interface of the UI application 112.

Figure 3A:
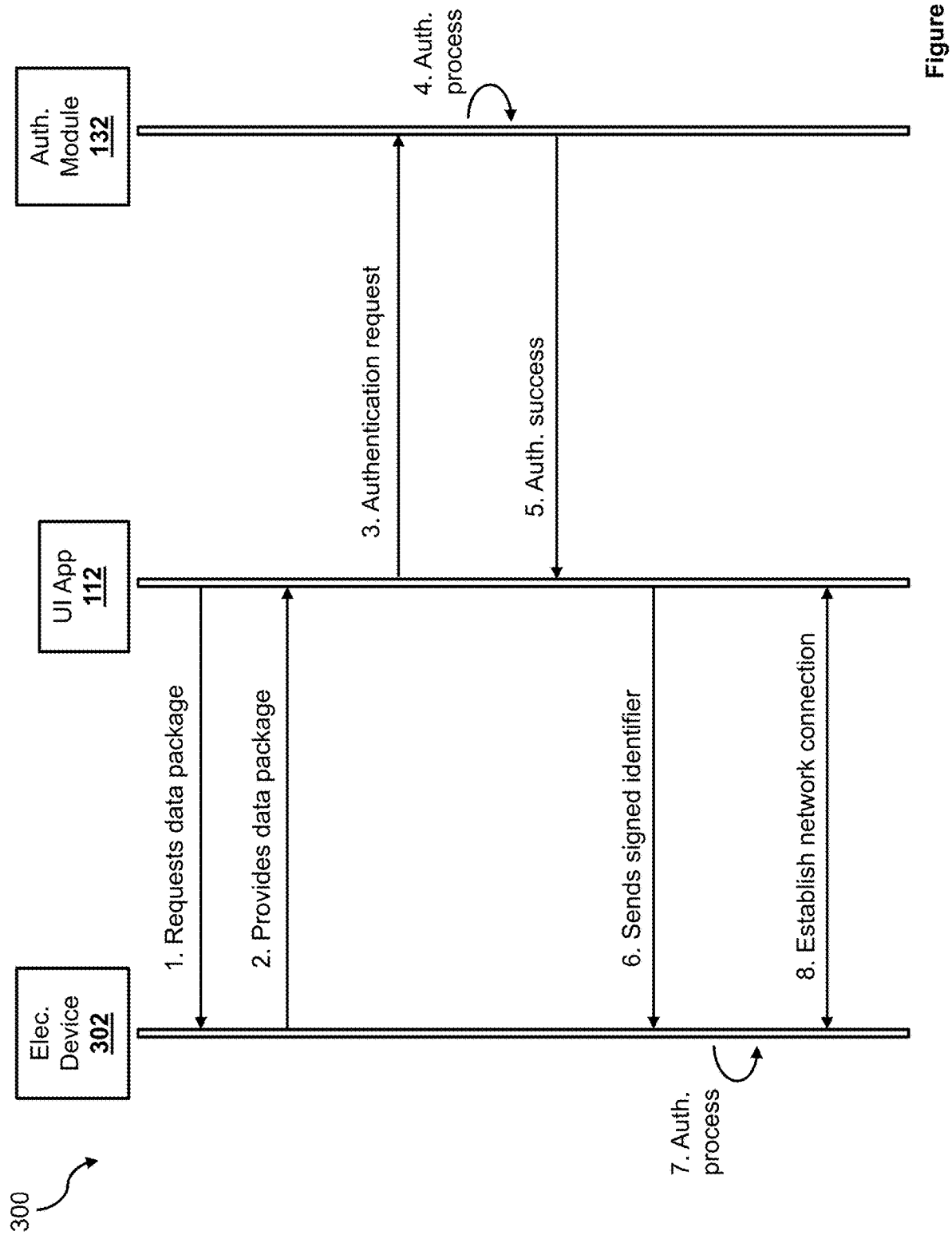
FIG. 3A illustrates example data communications for authenticating an electronic device according to an embodiment of the present disclosure.

FIG. 3A illustrates the handshake protocol according to various embodiments of the disclosure. Specifically, FIG. 3A is a swimlane diagram describing communications among a communication component of an electronic device (e.g., the electronic vaping device 200), the UI application 112, and the authentication module 132, as part of the handshake protocol. First, upon detecting the signal (e.g., BLE signal) from the electronic device 302 having a recognizable service identifier, the UI application 112 may send a request for a data package to the electronic device 302. The communication component of the electronic device 302 may prepare the data package, which may include the token that has been assigned to the electronic device 302 and a device identifier associated with the electronic device 302. The communication component of the electronic device 302 may send the data package to the UI application 112. In some embodiments, the data package may be encrypted using a public key associated with the UI application 112 and signed using a private key associated with the electronic device 302.

By decrypting the data package using a public key associated with the electronic device 302 (e.g., retrieved from the authentication module 132), the UI application 112 may determine that the communication component of the electronic device 302 has satisfied a first step of the authentication process. The UI application 112 may extract (e.g., through a decryption process, etc.) the token and the device identifier from the data package, and may transmit an authentication request to the authentication module 132. The authentication request may include the token and the device identifier obtained from the communication component of the electronic device 302.

The authentication module 132 may authenticate the electronic device based on the token and the device identifier. For example, the authentication module 132 may retrieve a record from the blockchain 190 using the token. The record may include a device identifier that is associated with the token when a device was registered with the service provider server 130. If the device identifier received in the authentication request does not match the device identifier from the record in the blockchain 190, the authentication module 132 may determine that the electronic device 302 is not authenticated, and may transmit an authentication failure response to the UI application 112. In this case, the UI application may abort the handshake protocol such that the user device cannot connect to the electronic device 302 (and the electronic device 302 remains inactive/locked).

On the other hand, if the authentication module 132 determines that the device identifier from the data package matches the device identifier in the record, the authentication module 132 may determine that the electronic device 302 is authenticated, and may send an authentication success response to the UI application 112.

Upon receiving the authentication success response from the authentication module 132, the UI application n112 may also send a signed identifier (e.g., signed using a private key associated with the UI application 112) to the communication component of the electronic device 302. The electronic device 302 may also authenticate the UI application 112 based on the signed identifier (e.g., by determining whether the signed identifier can be decrypted using the public key associated with the UI application 112). Once both of the electronic device 302 and the UI application 112 are authenticated, the communication component of the electronic device 302 and the UI application 112 may establish a network connection (e.g., a Bluetooth connection). The UI application 112 may transmit instructions to the communication component of the electronic device 302 via the network connection, such as to instruct the communication component to activate a control element (e.g., a heating element, etc.) of the electronic device 302.

Figure 3B:
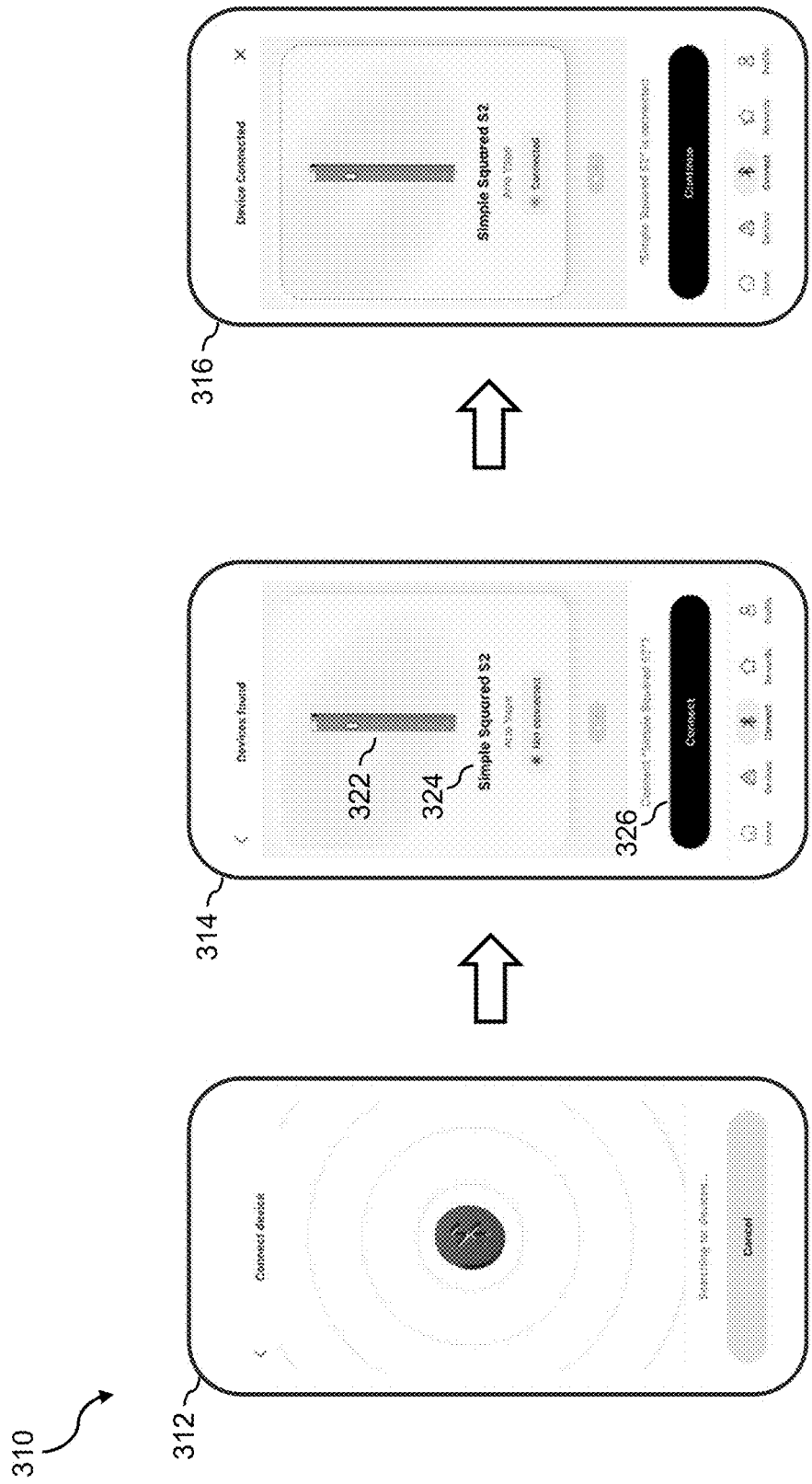
FIG. 3B illustrates example user interfaces of an application while performing a handshake protocol with an electronic device according to an embodiment of the present disclosure.

FIG. 3B illustrates a user interface sequence 310 of the UI application 112 while the UI application 112 performs the handshake protocol with an electronic device (e.g., one of the electronic devices 180, 190, 200, 302. After receiving a request to connect to an electronic device, the UI application 112 may scan for nearby electronic devices that have been registered with the service provider server. For example, the UI application 112 may detect signals emitted by nearby devices that include service identifiers corresponding to the ones assigned by the authentication module 132 to registered electronic devices. The user interface 312 illustrates the user interface of the UI application 112 while the UI application 112 scans for the registered electronic devices.

Once a registered electronic device is found, the UI application 112 may initiate the handshake protocol with the electronic device. At this time, the UI application 112 of the user device 110 and the electronic device has not established a network connection. However, data may be exchanged during the handshake protocol such that the UI application 112 may authenticate the electronic device. For example, the UI application 112 may authenticate the electronic device using a data package provided by the electronic device. After authenticating the electronic device, the UI application 112 may present a representation of the electronic device on a user interface 314. In this example, the detected electronic device is an electronic vaping device having a device name "Simple Squared S2." As such, the UI application 112 may generate the user interface 314 to include an image of the electronic device 322, a name of the electronic device 324, and also a selectable element (e.g., a button) 326 that enables the user 140 to confirm establishing a connection with the electronic device and activating a functionality of the electronic device. It is noted that the electronic device would not be discovered and presented to the user 140 by any other applications of the user device 110 due to the customized communication component of the electronic device.

After detecting that the user 140 has selected the button 326, the UI application 112 may establish a network connection with the electronic device. The UI application 112 may also instruct the communication component of the electronic device to activate the functionality of the electronic device (e.g., the heating element of the electronic vaping device). The UI application 112 may also present a user interface 316 indicating to the user 140 that the electronic device has been connected with the user device 110. The UI application 112 may also enable the user 140 to perform other functions on the electronic device via other user interfaces provided by the UI application 112.

Figure 4:
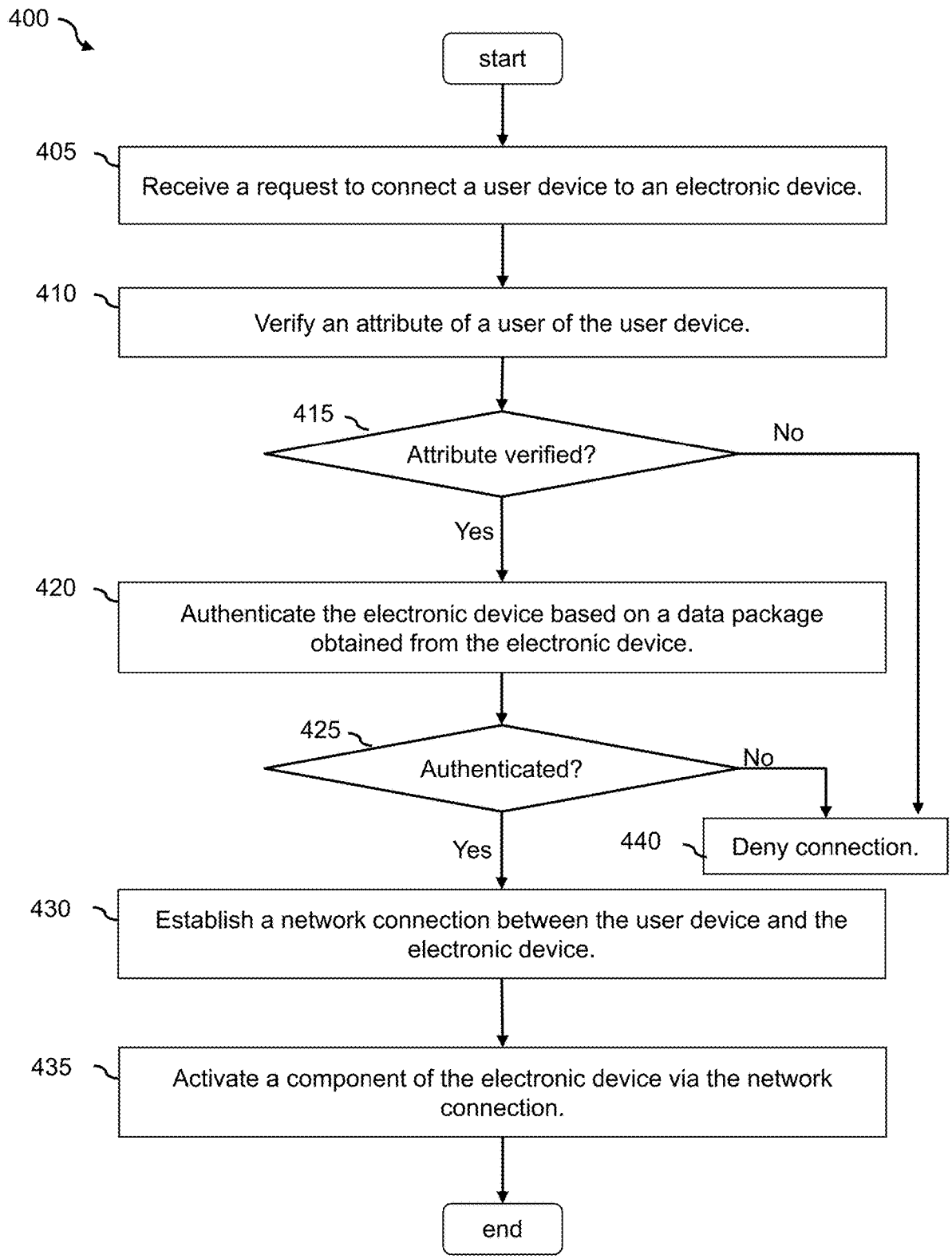
FIG. 4 is a flowchart showing a process of connecting and activating an electronic device according to an embodiment of the present disclosure.

FIG. 4 illustrates a process 400 for connecting and activating an electronic device according to various embodiments of the disclosure. In some embodiments, at least a portion of the process 400 may be performed by the UI application 112 and the authentication module 132. The process 400 may begin by receiving (at step 405) a request to connect a user device to an electronic device. For example, the UI application 112 may receive a request, via a user interface of the UI application 112 from the user 140, a request to connect the user device 110 to various electronic devices.

The process 400 includes a step 410 of verifying an attribute of a user of the user device. For example, after receiving the request, the UI application 112 may obtain biometric data (e.g., an image of the face of the user 140, a fingerprint of the user 140, etc.) using a sensor of the user device 110. The UI application 112 may transmit the biometric data to the identity verification server 122 via an API call. The UI application 112 may receive user data associated with the user 140 (e.g., a birthdate, a citizenship, a residential address, etc.) as a response of the API call from the identity verification server 122. The UI application 112 may then determine (at step 415) if the user 140 satisfies access criteria associated with various electronic devices registered with the service provider server 130 based on the user data. If the user 140 does not satisfy the access criteria (e.g., attribute not verified), the UI application may deny (at step 440) connection with the electronic device.

On the other hand, if the UI application 112 determines that the user 140 satisfies the access criteria of an electronic device, the UI application 112 scans for registered electronic devices that are within a distance of the user device 110. The UI application 112 may detect a registered electronic device based on a service identifier included in a signal emitted by a communication component of an electronic device. The UI application 112 proceeds to authenticate (at step 420) the electronic device based on a data package obtained from the electronic device. For example, the UI application 112 may send a request for the data package to the electronic device. The electronic device may transmit the data package, which may include a token and a device identifier, to the UI application 112. The UI application 112 may send the token and the device identifier as an authentication request to the authentication module 132. The authentication module 132 may determine whether the electronic device is authenticated based on the token, the device identifier, and a record on the blockchain 190.

If the electronic device is not authenticated by the authentication module 132, the UI application again denies (at step 440) the connection with the electronic device. On the other hand, if the electronic device is authenticated by the authentication module 132, the UI application 112 establishes (at step 430) a network connection between the user device and the electronic device, and activates (at step 435) a component of the electronic device via the network connection such that the user 140 may operate the electronic device.

Figure 5:
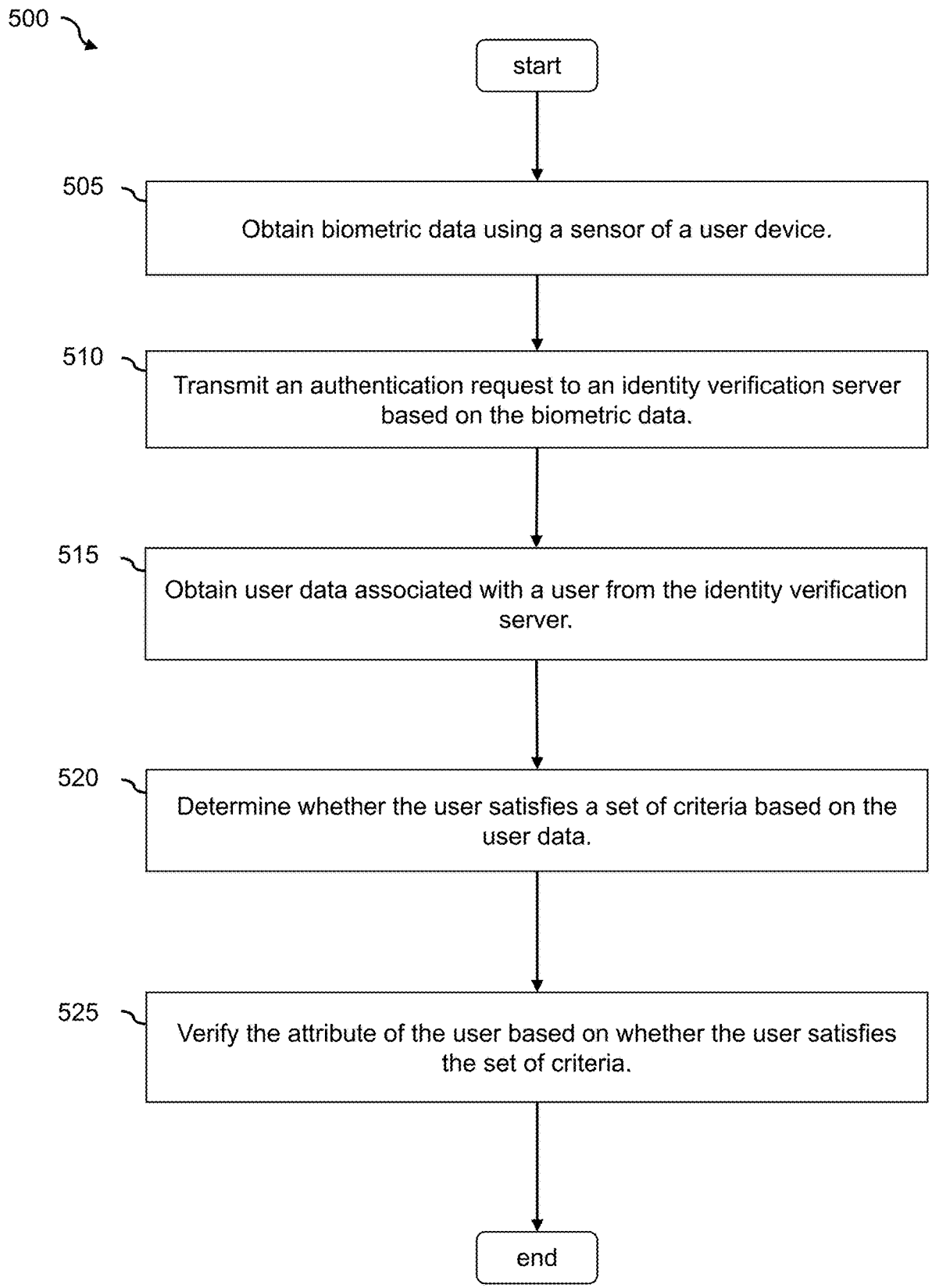
FIG. 5 is a flowchart showing a process of verifying an attribute of a user according to an embodiment of the present disclosure.

FIG. 5 illustrates a process 500 for verifying an attribute of a user according to various embodiments of the disclosure. In some embodiments, at least a portion of the process 500 may be performed by the UI application 112 and the authentication module 132. The process 500 may begin by obtaining (at step 505) biometric data using a sensor of a user device. For example, the UI application 112 may obtain biometric data, such as an image of the face of the user 140, a fingerprint of the user 140, etc. via a sensor of the user device 110. The UI application 112 then transmits (at step 510) an authentication request to an identity verification server 122 based on the biometric data and obtains (at step 515) user data associated with ha user from the identity verification server 122. The identity verification server 122 may retrieve a record based on the biometric data. The record may include user data extracted from an identity document (e.g., a government issued document such as a passport, a driver's license, etc.). The identity verification server 122 may send the user data to the UI application as a response to the authentication request.

The process 500 also includes a step 520 of determining whether the user satisfies a set of criteria based on the user data and a step 525 of verifying the attribute of the user based on whether the user satisfies the set of criteria. For example, the UI application 112 may obtain a set of access criteria associated with the electronic device. The set of access criteria may specify the types of users who may access the electronic device, which may include one or more requirements such as an age requirement, a citizenship requirement, a residential address requirement, an identity requirement, etc. The UI application 112 may determine whether the user 140 satisfies the criteria based on the user data obtained from the identity verification server 122. The UI application 112 may determine that the attribute of the user is verified if the user data indicates that the user 140 satisfies the set of access criteria.

Figure 6:
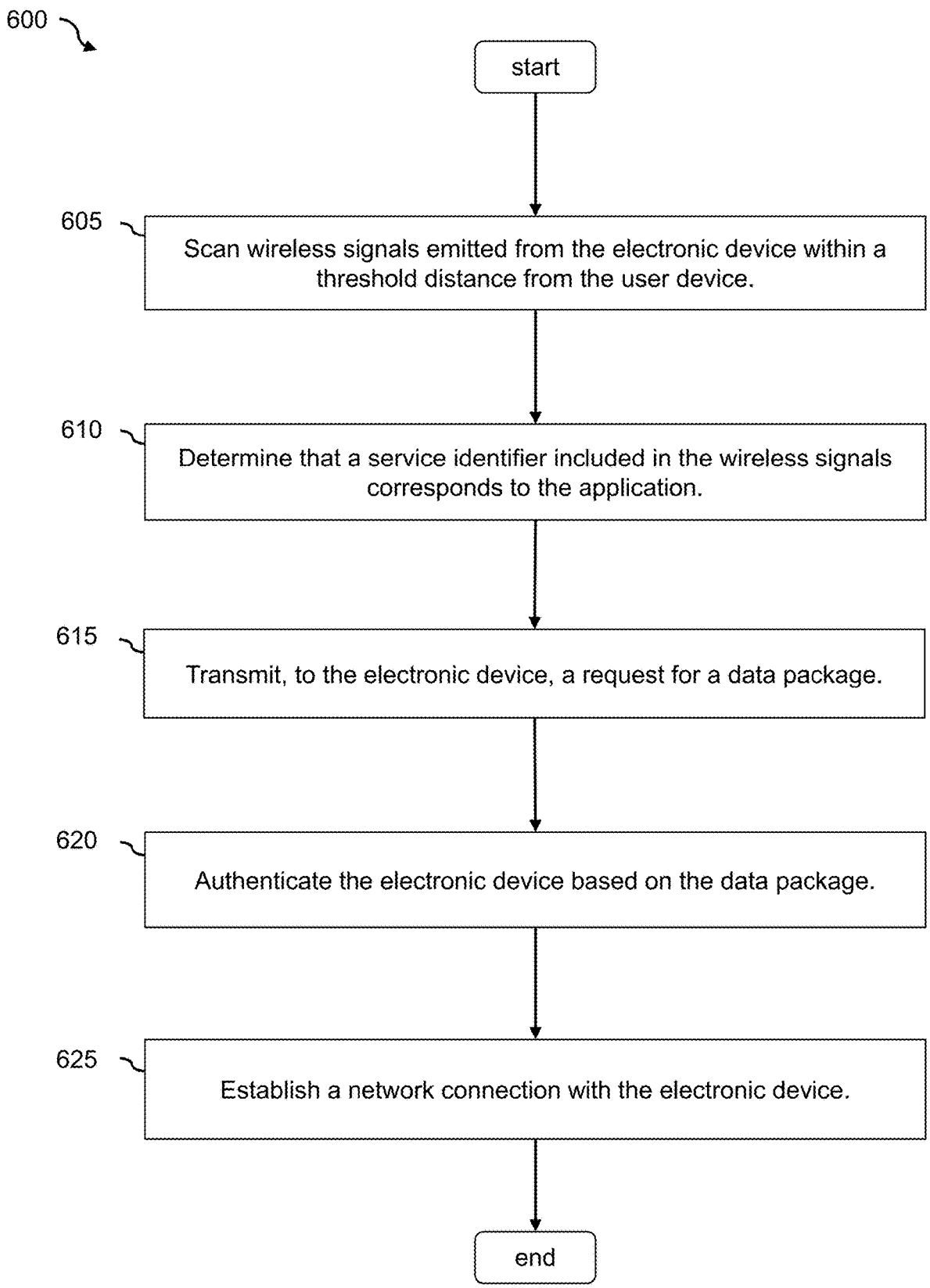
FIG. 6 is a flowchart showing a process of authenticating an electronic device according to an embodiment of the present disclosure.

FIG. 6 illustrates a process 600 for authenticating an electronic device according to various embodiments of the disclosure. In some embodiments, at least a portion of the process 600 may be performed by the UI application 112 and the authentication module 132. The process 600 may begin by scanning (at step 605) wireless signals emitted from the electronic device within a threshold distance from the user device. For example, the UI application 112 may use the communication component 114 to detect wireless signals emitted from nearby electronic devices. By default, the communication component 114 may ignore signals having service identifiers that are outside a specific range, such that the electronic device is undiscoverable by the user devices. However, the UI application 112 may instruct the communication component 114 to detect any signals having service identifiers that correspond to those assigned by the service provider server 130 to registered electronic devices.

As such, the UI application 112 determines (at step 610) that a service identifier included in the wireless signals corresponds to the application, and transmits (at step 615), to the electronic device, a request for a data package. The electronic device may prepare the data package using the token provided to the electronic device by the authentication module 132 and a device identifier associated with the electronic device. The electronic device may then send the data package to the UI application 112.

The UI application 112 and the authentication module 132 then authenticate (at step 620) the electronic device based on the data package. For example, the UI application 112 may send an authentication request to the authentication module 132, the authentication request including the token and the device identifier. The authentication module 132 may retrieve a record (e.g., from the blockchain 190) based on the token, and determine if the device identifier stored in the record corresponds to the device identifier in the authentication request. If the two device identifier matches, the authentication module 132 may authenticate the electronic device and send an authentication success response to the UI application 112. Upon receiving the authentication success response, the UI application 112 establishes (at step 625) a network connection with the electronic device.

Figure 7:
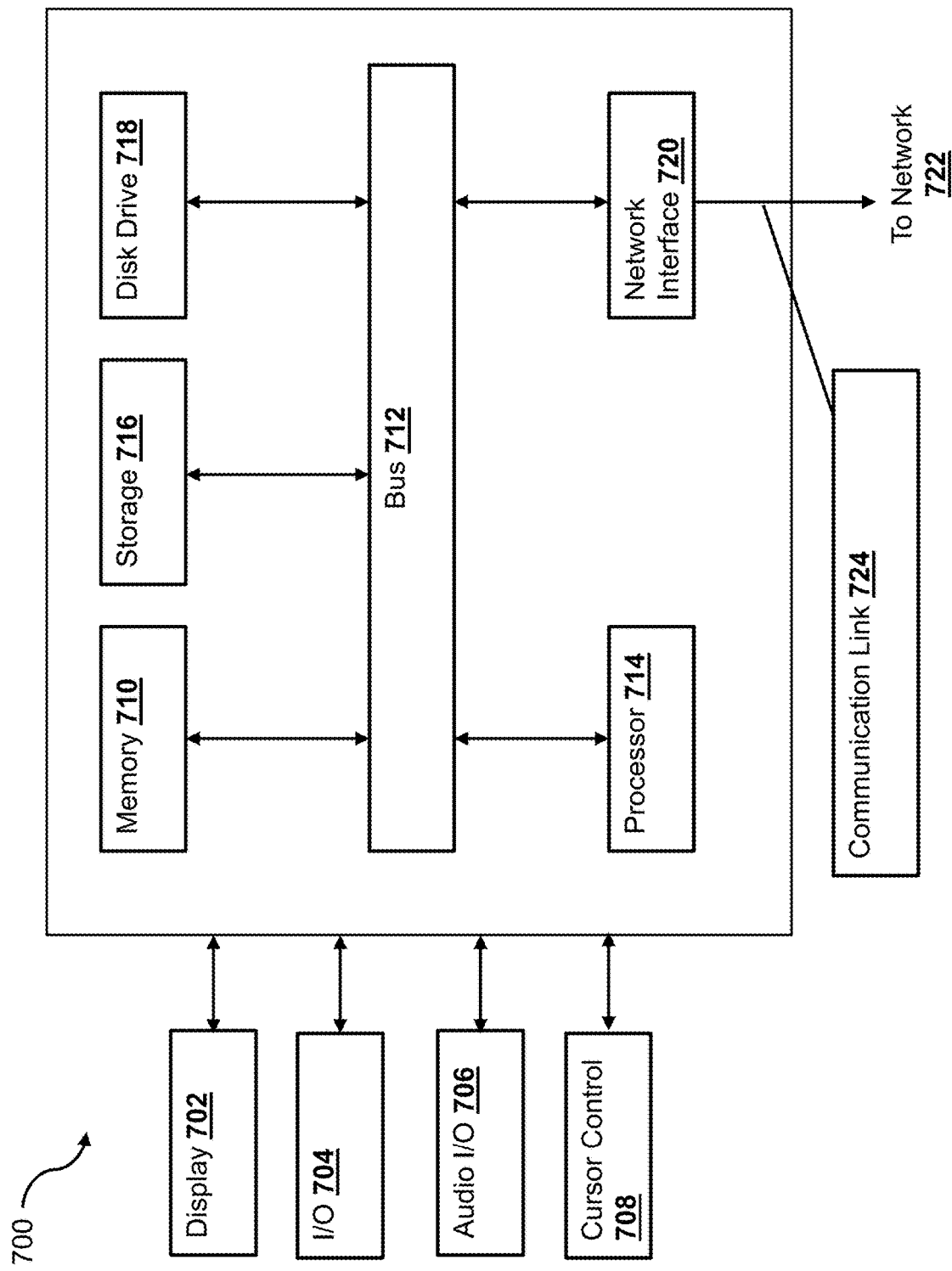
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the manufacturer server 120, the identity verification server 122, the user device 110, and the electronic devices 180 and 190. In various implementations, the user device 110 may include a mobile cellular phone, personal computer (PC), laptop, wearable computing device, etc. adapted for wireless communication, and each of the service provider server 130, the manufacturer server 120, and the identity verification server 122 may include a network computing device, such as a server. Each of the electronic devices 180 and 190 may be a limited purpose device that includes at least some of the components described in FIG. 7, but may have less capabilities (e.g., less processing power, less networking capabilities, etc.) than the other devices. Thus, it should be appreciated that the devices/servers 110, 120, 122, 130, 180, and 190 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the electronic devices access control functionalities described herein according to the processes 400, 500, and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A user device, comprising:
    a non-transitory memory;
    a wireless communication element; and
    one or more hardware processors coupled with the non-transitory memory and configured to read instructions from the non-transitory memory to cause the user device to perform operations comprising:
        receiving, by a first application executed on the user device, a request to connect the user device to an electronic device, wherein the electronic device is undiscoverable by a plurality of applications of the user device except the first application;
        verifying, by the first application, an attribute associated with a user of the user device;
        in response to verifying the attribute associated with the user, scanning, by the first application, signals emitted by one or more electronic devices based on a service identifier that is outside a range of service identifiers recognizable by the plurality of applications;
        in response to detecting a signal emitted by the electronic device that includes the service identifier, communicating, by the first application and via the wireless communication element of the user device, with the electronic device according to a handshake protocol;
        obtaining, by the first application, an encrypted package from the electronic device based on the communicating, wherein the encrypted package represents data unique to the electronic device;
        authenticating the electronic device based on the encrypted package; and
        in response to authenticating the electronic device, enabling the user device to control one or more functionalities of the electronic device.

2. The user device of claim 1, wherein the operations further comprise:
    establishing a network connection between the user device with the electronic device via the wireless communication element.

3. The user device of claim 2, wherein the user is enabled to control the one or more functionalities of the electronic device via the application based on one or more communications between the application and the electronic device via the network connection.

4. The user device of claim 1, wherein a functionality of the electronic device is inoperable when the request is received, and wherein the operations further comprise:
    providing the user access to the functionality of the electronic device based on transmitting a signal to a second wireless communication element of the electronic device.

5. The user device of claim 4, wherein the electronic device is an electronic vaping device, and wherein the functionality is associated with a heating element of the electronic vaping device for heating a substance in the electronic vaping device.

6. The user device of claim 1, wherein the communicating according to the handshake protocol comprises:
    obtaining a service identifier associated with a second wireless communication element of the electronic device; and
    determining that the service identifier corresponds to an entity associated with the application.

7. The user device of claim 1, wherein the operations further comprise:
    obtaining, using a sensor of the user device, biometric data associated with the user;
    retrieving user data associated with the user from a server based on the biometric data, wherein the verifying the attribute associated with the user is based on the user data obtained from the server.

8. A method comprising:
    receiving, by a first application executing on a first device, a request to connect the first device to a second device, wherein the second device is undiscoverable by a plurality of applications of the first device except the first application when the request is received;
    verifying, by the first application, an attribute associated with a user of the first device;
    in response to verifying the attribute associated with the user, scanning, by the first application, signals emitted by one or more devices based on a service identifier that is outside a range of service identifiers recognizable by the plurality of applications;
    detecting, by the first application, a signal emitted by the second device that includes the service identifier;
    communicating, by the first application, with the second device according to a handshake protocol via a wireless communication;
    obtaining, by the first application, a data package from the second device based on the communicating, wherein the data package comprises data unique to the second device;
    authenticating the second device based on the data package; and
    establishing a network connection between the first device and the second device.

9. The method of claim 8, further comprising:
    enabling the of the first device to control the second device via an interface of the first application based on one or more communications between the first application and the second device via the network connection.

10. The method of claim 8, wherein the attribute is an age attribute.

11. The method of claim 8, wherein the attribute is a citizenship attribute.

12. The method of claim 8, further comprising:
    extracting a device identifier and a blockchain token from the data package;
    accessing a record on a blockchain using the blockchain token, wherein the authenticating the second device is further based on the record.

13. The method of claim 8, further comprising:
obtaining, using a sensor of the first device, biometric data associated with the user;
retrieving user data associated with the user from a server based on the biometric data, wherein the verifying the attribute associated with the user is based on the user data obtained from the server.

14. The method of claim 13, wherein the biometric data comprises facial features associated with the user.

15. A non-transitory computer-readable medium having stored thereon instructions executable by a user device to perform operations comprising:
receiving, by a first application executed on the user device, a request to connect the user device to an electronic device, wherein the electronic device is undiscoverable by a plurality of applications of the user device except the first application;
verifying, by the first application, an attribute associated with a user of the user device;
in response to verifying the attribute associated with the user, scanning, by the first application, signals emitted by one or more electronic devices based on a service identifier that is outside a range of service identifiers recognizable by the plurality of applications;
detecting, by the first application, a signal emitted by the electronic device that includes the service identifier;
communicating, by the first application and via a wireless communication element of the user device, with the electronic device according to a handshake protocol;
obtaining, by the first application, an encrypted package from the electronic device based on the communicating, wherein the encrypted package represents data unique to the electronic device;
authenticating the electronic device based on the encrypted package; and
in response to authenticating the electronic device, enabling the user device to control the electronic device via the first application.

16. The non-transitory computer-readable medium of claim 15, wherein the electronic device is an electronic vaping device comprising a heating element, wherein the heating element is inactive when the request is received, and wherein the operations further comprise:
in response to authenticating the electronic device, activating the heating element.

17. The non-transitory computer-readable medium of claim 15, wherein the operations further comprise:
establishing a network connection between the user device and the electronic device.

18. The non-transitory computer-readable medium of claim 17, wherein the electronic device is a first electronic device, and wherein the operations further comprise:
subsequent to establishing the connection between the user device and the first electronic device, restricting the user device from connecting to a second electronic device.

19. The non-transitory computer-readable medium of claim 17, wherein the operations further comprise enabling the user to control the electronic device via the network connection.

20. The non-transitory computer-readable medium of claim 15, wherein a functionality of the electronic device is inoperable when the request is received, and wherein the operations further comprise:
providing the user access to the functionality of the electronic device based on transmitting a signal to a wireless communication element of the electronic device.

* * * * *